United States Patent
Haddock

(10) Patent No.: US 7,193,805 B1
(45) Date of Patent: Mar. 20, 2007

(54) FLYING-TYPE DISK DRIVE SLIDER WITH MICROPAD

(75) Inventor: Quinn Haddock, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 202 days.

(21) Appl. No.: 10/702,927

(22) Filed: Nov. 6, 2003

Related U.S. Application Data

(63) Continuation-in-part of application No. 09/528,686, filed on Mar. 20, 2000, now Pat. No. 6,707,631.

(60) Provisional application No. 60/424,955, filed on Nov. 8, 2002.

(51) Int. Cl.
  G11B 21/02 (2006.01)
  G11B 21/20 (2006.01)
  G11B 5/127 (2006.01)
  B21C 37/30 (2006.01)
  G11B 17/00 (2006.01)

(52) U.S. Cl. ............ 360/75; 360/235.7; 360/235.8; 360/236.3; 360/69; 360/70; 360/72.1; 29/90.01; 29/603.03

(58) Field of Classification Search ............ 360/234.8
See application file for complete search history.

(56) References Cited

U.S. PATENT DOCUMENTS

| 3,488,648 | A | 1/1970 | Church ............ 340/174.1 |
| 3,823,416 | A | 7/1974 | Warner ............ 360/122 |
| 4,669,011 | A | 5/1987 | Lemke ............ 360/103 |
| 4,692,832 | A | 9/1987 | Bandara et al. ............ 360/137 |
| 4,845,816 | A | 7/1989 | Nanis ............ 29/90.01 |
| 5,041,932 | A | 8/1991 | Hamilton ............ 360/104 |
| 5,168,413 | A | 12/1992 | Coker et al. ............ 360/137 |
| 5,255,141 | A | 10/1993 | Valstyn et al. ............ 360/126 |
| 5,396,387 | A | 3/1995 | Murray ............ 360/103 |
| 5,404,256 | A | 4/1995 | White ............ 360/236.3 |
| 5,408,373 | A | 4/1995 | Bajorek et al. ............ 360/244.3 |
| 5,420,735 | A | 5/1995 | Haines ............ 360/103 |
| 5,455,730 | A | 10/1995 | Dovek et al. ............ 360/113 |
| 5,508,862 | A | 4/1996 | Lazzari et al. ............ 360/103 |

(Continued)

FOREIGN PATENT DOCUMENTS

JP 05028414 A 2/1993

OTHER PUBLICATIONS

U.S. Appl. No. 09/528,686, filed Mar. 20, 2000, Haddock.

Primary Examiner—Hoa Thi Nguyen
Assistant Examiner—Jason Olson

(57) ABSTRACT

A slider (2') with a reduced fly height is disclosed. The slider includes a small micropad (66) on the lower surface (22') of the slider (2'). A sensor region (62) of a head (61) that is carried by the slider (2') protrudes into the micropad (66). The fluid pressure acting on an air bearing surface system (26) on the lower surface (22') of the slider (2') is insufficient to dispose the entire lower surface (22') of the slider (2') in spaced relation to its corresponding disk (136) during the initial portion of the very first operation of the disk drive. The micropad (66) is thereby burnished, and continues to burnish until the air bearing surface system (26) assumes a position relative to the disk (136) that allows the fluid pressure acting on the air bearing surface system (26) to dispose the entire lower surface (22') of the slider (2') in spaced relation to the disk (136).

36 Claims, 5 Drawing Sheets

U.S. PATENT DOCUMENTS

| | | | |
|---|---|---|---|
| 5,535,073 A | 7/1996 | Brezoczky et al. | 360/105 |
| 5,550,691 A | 8/1996 | Hamiton | 360/103 |
| 5,610,784 A | 3/1997 | Dorius et al. | 360/103 |
| 5,623,383 A | 4/1997 | Gregory et al. | 360/103 |
| 5,632,669 A | 5/1997 | Azarian et al. | 451/54 |
| 5,650,892 A | 7/1997 | Dorius et al. | 360/103 |
| 5,659,447 A | 8/1997 | Gregory et al. | 360/237 |
| 5,673,156 A | 9/1997 | Chen et al. | 360/97.01 |
| 5,687,046 A | 11/1997 | Mathews | 360/126 |
| 5,710,683 A | 1/1998 | Sundaram | 360/126 |
| 5,734,519 A | 3/1998 | Fontana et al. | 360/97.01 |
| 5,754,367 A | 5/1998 | Chang et al. | 360/103 |
| 5,768,055 A | 6/1998 | Tian et al. | 360/103 |
| 5,822,153 A | 10/1998 | Lairson et al. | 360/104 |
| 5,864,241 A | 1/1999 | Schreck et al. | 324/699 |
| 5,872,685 A | 2/1999 | Park et al. | 360/103 |
| 5,898,542 A | 4/1999 | Koshikawa et al. | 360/103 |
| 5,909,340 A | 6/1999 | Lairson et al. | 360/104 |
| 5,948,532 A | 9/1999 | Hwang et al. | 428/408 |
| 5,949,612 A | 9/1999 | Gudeman et al. | 360/97.01 |
| 5,978,181 A | 11/1999 | Niijima et al. | 360/113 |
| 5,995,324 A | 11/1999 | Haddock et al. | 360/103 |
| 6,144,528 A | 11/2000 | Anaya-Dufresne et al. | 360/235.4 |
| 6,160,683 A | 12/2000 | Boutaghou | 360/237.1 |
| 6,188,544 B1 | 2/2001 | Mino | 360/126 |
| 6,229,672 B1 | 5/2001 | Lee et al. | 360/236.8 |
| 6,243,234 B1 | 6/2001 | Haddock et al. | 360/237.1 |
| 6,252,742 B1 | 6/2001 | Kameyama | 360/237 |
| 6,333,835 B1 | 12/2001 | Kang et al. | 360/235.4 |
| 6,359,433 B1 | 3/2002 | Gillis et al. | 324/210 |
| 6,421,205 B1 | 7/2002 | Dorius et al. | 360/236.5 |
| 6,424,494 B1 | 7/2002 | Koishi | 360/235.6 |
| 6,445,542 B1 | 9/2002 | Levi et al. | 360/236.5 |
| 6,483,667 B1 | 11/2002 | Berg et al. | 360/235.6 |
| 6,493,184 B1 | 12/2002 | Smith | 360/135 |
| 6,556,381 B2 | 4/2003 | Kohira et al. | 360/236.3 |
| 6,804,085 B1 * | 10/2004 | Azarian et al. | 360/135 |
| 2002/0001157 A1 | 1/2002 | Kang et al. | 360/236.3 |

* cited by examiner

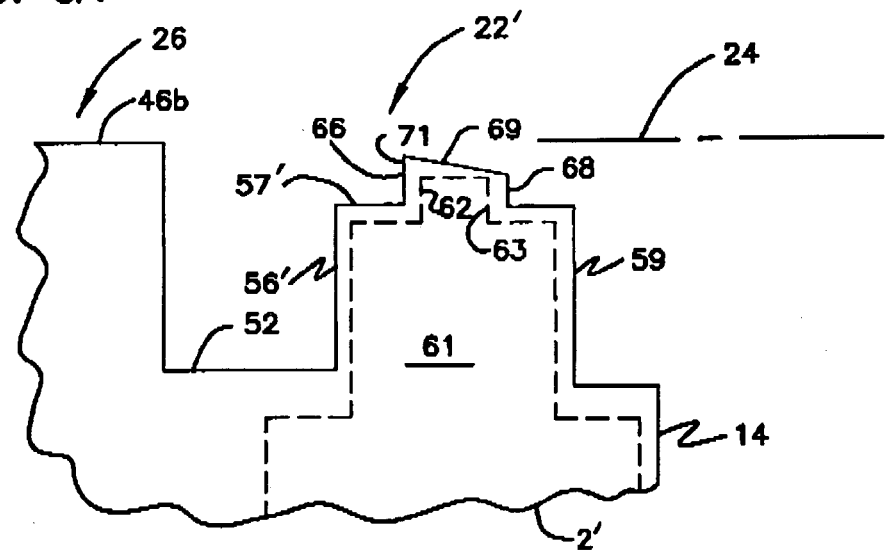
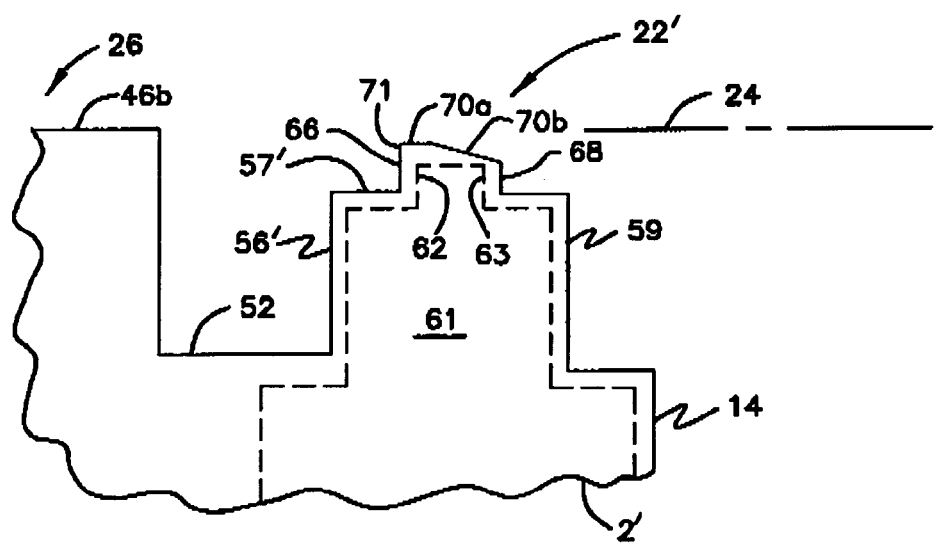

FLYING-TYPE DISK DRIVE SLIDER WITH MICROPAD

CROSS REFERENCE TO RELATED APPLICATIONS

This patent application claims priority under 35 U.S.C. § 119(e) to U.S. Patent Application Ser. No. 60/424,955, that was filed on Nov. 8, 2002, that is entitled "Slider Design-Micro Pad ABS Feature," and the entire disclosure of which is incorporated by reference in its entirety herein, and further is a continuation-in-part of and claims priority under 35 U.S.C. §120 to, U.S. patent application Ser. No. 09/528,686, that was filed on Mar. 20, 2000 now U.S. Pat. No. 6,707,631, that is entitled "Flying-Type Disk Drive Slider with Wear Pad," and the entire disclosure of which is also incorporated by reference in its entirety herein.

FIELD OF THE INVENTION

The present invention generally relates to the field of disk drives that utilize a flying-type slider that carries the read/write head and, more particularly, to embedding the read/write head poles in a micropad.

BACKGROUND OF THE INVENTION

One way to characterize the manner in which information is recorded to and/or read from a rigid, magnetic, computer-readable storage medium (e.g., a disk) is the manner in which the magnetic recording head interfaces with the disk. Contact recording has at least been proposed to place the head and disk in direct physical contact when exchanging signals therebetween. Theoretically this maximizes the performance of the head and disk at least in relation to reading information from and writing information to the disk. Other issues have kept contact recording systems from realizing commercial success. Constant contact between the head and disk presents both wear and contamination (e.g., through generation of particulates) issues which need to be addressed by the disk drive design. Heat generated by the continuous contact between the head and disk during disk drive operations can also have an adverse effect on the accuracy of the exchange of information between the head and disk (e.g., via thermal transients or asperities). Frictional forces from the contact between the recording head and disk can also cause data transfer problems in the form of track misregistrations, as well as bit shift or jitter caused by suspension and/or air-bearing resonance excitations.

Another approach which has been utilized in commercial disk drive designs is for the magnetic recording head to fly above the surface of the rigid, magnetic disk. Typically the magnetic recording head includes a slider with a magnetic recording and/or writing element(s) carried thereby. One or more air-bearing surfaces are included on the lower surface of the slider which project at least generally toward the disk. These air-bearing surfaces are shaped/oriented on the slider body so that the boundary layer of air which is carried by the rigid disk during rotation thereof is compressed and forced to flow underneath the slider. Rotation of the disk in excess of a certain velocity will generate sufficient forces on the air bearing surfaces to lift the slider above the surface of the disk toward which the air-bearing surfaces at least generally project.

Relatively significant development efforts have been directed to the design of the air-bearing surfaces of sliders of the flying type. The problems which have been addressed by these efforts have not been simply to realize flying of the slider in spaced relation to the disk, but instead to considerations such as attempting to accurately control the fly height or to achieve a consistent fly height. Another area of focus has been to attempt to minimize the spacing between the head and disk during disk drive operations without actually having any significant contact which can have adverse effects on data transfer operations, as well as the operability of the disk drive or components thereof. Current state-of-the art, commercially available disk drives with MR/GMR heads operate with an average fly height of about 10 nanometers. However, this does not correspond with a 10 nanometer spacing between the magneto-resistive recording element and the disk. Pole-tip recession typically adds another 3–5 nanometers to the actual spacing being the recording element and the disk, as does the carbon overcoat which is typically included on the bottom surface of current flying sliders. Reducing the spacing between the flying head and rigid, rotating disk would be desirable to realize higher bit and track densities.

BRIEF SUMMARY OF THE INVENTION

The present invention is embodied by sliders that fly above a rotating, rigid computer-readable storage medium in a disk drive. Hereafter, this will be characterized as a "disk." More specifically, the present invention is embodied by a flying slider having what may be characterized as a wear pad which is disposed typically at least generally adjacent to a trailing edge of the slider and which will typically carry the sensor(s) or transducer(s) which operatively interface with the disk to read and/or write information therefrom/thereto. This wear pad is burnished during the initial operation of the disk drive to create a small gap between the slider and the disk which is in effect customized to the disk drive at issue. Principles of the present invention may be used in both contact start/stop type disk drive designs, and well as in load/unload type disk drive designs.

A first aspect of the present invention is directed to a disk drive that includes a data storage disk having a first data storage surface, as well as a head positioner assembly. This head positioner assembly in turn includes a slider that may be characterized as extending along a reference axis to define its longitudinal extent. The slider includes upper and lower surfaces, with the lower surface at least generally projecting toward the first data storage surface of the data storage disk. The slider further includes a leading edge and trailing edge that would be longitudinally spaced relative to the above-noted reference axis. Other portions of the slider include a pair of sides that are laterally spaced relative to the above-noted reference axis and which extend at least generally longitudinally between the leading and trailing edges of the slider.

The lower surface of the slider of the subject first aspect is designed to provide a significantly reduced fly height in comparison to the prior art, and which is typically only slightly more than the glide height or glide avalanche. In this regard, the lower surface of the slider includes an air bearing surface system (i.e., one or more air bearing surfaces on which a fluid pressure acts to generate a force that "lifts" or forces the slider into a spaced relationship with the data storage disk) that is disposed within a reference plane. The lower surface further includes a first wear pad that includes a first wear pad surface that defines the distal end of the first wear pad. This first wear pad is separate from and not part of the air bearing surface system. At least part of the first wear pad surface is planar and is disposed at an angle relative to the reference plane in which the air bearing surface system is disposed. The first wear pad surface is small. A head is carried by the slider and includes at least one sensor component that may be characterized as protruding in the direction of the first wear pad surface.

Various refinements exist of the features noted in relation to the subject first aspect of the present invention. Further features may also be incorporated in the subject first aspect of the present invention as well. These refinements and additional features may exist individually or in any combination. The first wear pad is preferably disposed close to or at the trailing edge of the slider. The first wear pad is preferably small, and further is preferably a non-air bearing surface. In one embodiment, the pressurization at the trailing edge of the slider in the case of the first aspect is preferably at or near zero.

The first wear pad in the case of the first aspect is small in size to reduce the amount of the first wear pad that is burnished in order to allow the air bearing surface system to be able to dispose the slider in spaced relation to the first data storage surface of the data storage disk during disk drive operations. That is, the fluid pressure acting on the air bearing surface system is insufficient to dispose the slider in spaced relation to the first data storage surface of the data storage disk until after the first wear pad has been sufficiently burnished. This burnishing of the first wear pad defines that portion of the first wear pad surface that is planar and that is disposed at an angle to the reference plane that contains the air bearing surface system. The majority of this burnishing will take place during the initial operation of the disk drive, but before any shipment of the drive to a customer (i.e., the burnishing in accordance with the first aspect may be considered to be part of the assembly/manufacture of the disk drive). That is, after the first wear pad has been burnished to the point where the slider thereafter begins to fly during the initial operation of the disk drive, the amount that the first wear pad may be burnished during any subsequent operation of the disk drive should be minimal. Since one or more sensor components of the head protrude in the direction of the first wear pad surface, the burnishing of the first wear pad reduces the spacing between these sensor components and the first data storage surface of the data storage disk.

There are a number of ways to characterize "small" in relation to the first wear pad in the case of the first aspect. One is in relation to the surface area of the first wear pad surface. In one embodiment, the surface area of the first wear pad surface is no more than about 100 $\mu m^2$. Another way to characterize the smallness of the first wear pad is that the first wear pad associated with the first aspect is preferably sized to be the same size as or only slightly larger than those sensor components of the head (e.g., the read element(s), the write element(s), or both) that protrude toward the first wear pad surface and that are typically located at or only slightly recessed from the first wear pad surface (e.g., those sensor components that are disposed within a few nanometers of the first wear pad surface before any burnishing of the first wear pad, such as within about 5 $\mu m$ in one embodiment, within 4 $\mu m$ in another embodiment, within about 3 $\mu m$ in another embodiment, within about 2 $\mu m$ in another embodiment, and within about 1 $\mu m$ in yet another embodiment; those sensor components that are closest to the first wear pad surface). These sensor components may be characterized as occupying a sensor region. In one embodiment, the surface area of the first wear pad surface is large enough, taking into consideration mask alignment, to ensure that the same will encompass the area of the sensor region when projected onto the first wear pad surface, but no larger. That is, the surface area of the first wear pad surface could be exactly the same size as the surface area of the sensor region, but will typically be slightly larger to account for mask alignment tolerances. Yet another way to characterize the small size of the first wear pad is that the trailing edge of the first wear pad and the trailing edge of the noted sensor region are spaced by a distance of no more than about 5 $\mu m$, measured parallel to the reference plane in which the air bearing surface system is disposed.

In one embodiment of the first aspect, the entire first wear pad surface is planar and is disposed an angle relative to the first reference plane that contains the air bearing surface system. That is, the above-noted burnishing would continue until the entire distal end of the first wear pad was disposed at an angle to the reference plane in which the air bearing surface system is disposed. Another embodiment has a flat defined on only part of the first wear pad surface (e.g., on a "trailing" portion of the first wear pad) and that is disposed at an angle relative to the reference plane in which the air bearing surface system is disposed. A remainder of the first wear pad surface in the latter instance may also be a planar surface, but one that is either disposed within the first reference plane or that is recessed from and parallel to the first reference plane. Stated another way, the first wear pad surface may include a first portion that extends from a leading edge of the first wear pad toward, but not to, a trailing edge of the first wear pad and that is coplanar or parallel with the reference plane in which the air bearing surface system is disposed, as well as a second portion that extends from the trailing edge of the first wear pad toward, but not to, the leading edge of the first wear pad and that is disposed at an angle relative to the reference plane in which the air bearing surface system is disposed. This second configuration could be the result of only a portion of the distal end of the first wear pad being burnished.

The first wear pad used by the slider in the case of the first aspect may be characterized as being located closer to the trailing edge of the slider than to the leading edge of the slider, and will typically be disposed at or in close proximity to the trailing edge of the slider. In one embodiment, the center (in the trailing edge-leading edge dimension) of the first wear pad is spaced from the trailing edge of the slider by a distance of no more than about 30 microns. The first wear pad surface may be vertically offset from a portion of the lower surface that extends from the first wear pad to the trailing edge of the slider by a distance at least about 1 micro-inch.

The first wear pad may be located at any appropriate location on the lower surface of the slider in the case of the first aspect. For instance, the first wear pad again may be disposed at or in close proximity to the trailing edge of the slider as noted above. Moreover, the first wear pad may be centrally disposed between the opposing sides of the slider. The first wear pad may be disposed on a second wear pad that is larger than the first wear pad. The lower surface of the slider may include a deep recess (e.g., at least about 600 nanometers deep) at the leading edge of the second wear pad such that neither the second wear pad nor the first wear pad will function as an air bearing surface. Such a deep recess may be disposed immediately in front of the first wear pad, as well as in any location that significantly reduces the pressure acting on the first wear pad (preferably to at or near zero psi). In any case, the second wear pad may be defined by a first material of a first hardness from a first location to its leading edge, and may be defined by a second material of the second hardness from this same first location to its trailing edge, with the second hardness being less than the first hardness. The first wear pad may be formed entirely from this second material (e.g., alumina).

The first wear pad may protrude from the lower surface by a distance of at least about 1 micro-inch in one embodiment of the first aspect, by a distance within a range of about 1 micro-inch to about 3 micro-inches in another embodiment of the first aspect, and by a distance within a range of about 1 micro-inch to about 5 micro-inches in yet another embodiment of the first aspect. A timed etch may be used to define the first wear pad. Preferably this etch would be terminated prior to encountering any of the electrical components of the head being carried by the slider. This spacing may exist around the entire perimeter of the first wear pad. This would then dispose the trailing edge of the first wear pad in spaced relation to the trailing edge of the slider.

The slider associated with the first aspect is preferably of the flying type, such that its air bearing surface system is disposed in non-parallel relation with the first data storage surface of the data storage disk. Typically the slider will be disposed such that the air bearing surface system is angled upwardly in the direction of the leading edge of the slider. Any appropriate pitch angle may be used by the slider when flying above the first data storage surface of the data storage disk.

BRIEF DESCRIPTION OF THE SEVERAL VIEWS OF THE DRAWING

FIG. 8A is a cutaway side view of the slider of FIG. 6 that illustrates one possible configuration of a micropad after being burnished by disk drive operations.

FIG. 8B is a cutaway side view of the slider of FIG. 6 that illustrates another configuration of a micropad after being burnished by disk drive operations.

DETAILED DESCRIPTION

Figure 1:
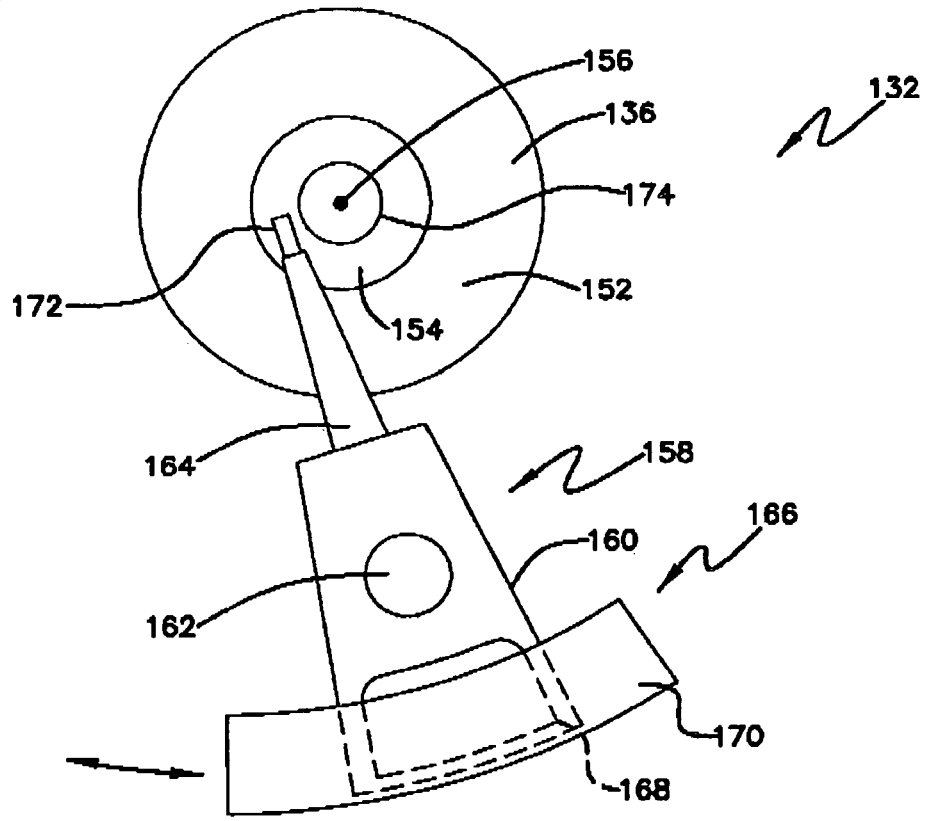
FIG. 1 is a top view of one embodiment of a disk drive.

Preface:

A second aspect of the present invention is embodied in a method for operating a disk drive which includes a rigid disk and a slider. A wear pad is disposed on a lower surface of the slider or that surface which at least generally projects toward the disk. The method includes executing a first flying step which in turn includes flying the slider a distance above the disk which is no more than the glide height or within the glide avalanche of the disk. The term "glide height" means a spacing between the disk and slider such that the slider contacts at least part of the disk (e.g., its upper surface roughness) during relative movement between the slider and disk (e.g., by rotation of the disk). While the slider is flying above the disk a distance which is no more than the glide height, the wear pad is burnished (e.g., material is removed from the wear pad). Burnishment of the wear pad is terminated and some time thereafter a second flying step is initiated, which may be immediately after the wear pad has been burnished to an appropriate degree. The slider thereafter flies above the disk a distance which is typically only slightly greater than the glide height during this second flying step such that the slider and disk remain in preferably constant spaced relation.

Various refinements exist of the features noted in relation to the subject second aspect of the present invention. Further features may also be incorporated in the subject second aspect of the present invention as well. These refinements and additional features may exist individually or in any combination. The lower surface of the slider may include at least one air bearing surface and a lifting force may be exerted thereon by rotation of the disk. While the wear pad is being burnished, the lifting forces are insufficient to dispose the slider above the disk a distance which is in excess of the glide height. Once the wear pad has been burnished, however, the lifting forces exerted on the air bearing surface(s) of the slider are sufficient so as to dispose the slider above the disk a distance which is typically slightly in excess of the glide height. Stated another way, while the disk is being rotated at a certain velocity, the slider is maintained at substantially a constant distance above the disk. This distance is selected such that the wear pad will contact the disk and will be burnished by this contact and relative movement between the disk and wear pad. Sufficient burnishment of the wear pad will eventually create a typically small gap between the slider and the disk while the disk continues to be rotated at the same velocity. Burnishing the wear pad in this manner thereby provides a typically very small gap between the slider and disk, which in turn yields a fly height of significantly reduced magnitude in relation to the known prior art. In one embodiment, the fly height is no more than about 5–6 nanometers above the mean plane of the surface roughness of the disk (i.e., the 5–6 nanometers includes the glide avalanche). Another way of characterizing this significantly reduced fly is that the fly height in relation to the subject second aspect of the present invention is only slightly greater than the glide avalanche. By disposing the read and/or write sensor in the wear pad associated with this second aspect of the present invention, the spacing between the same and the disk is also thereby reduced which enhances the operative interface therebetween (e.g., the exchange of signals to read and/or write). This gap is also customized in that the lower extreme of the wear pad is burnished into a surface which is at least substantially co-planar with the disk while the slider is flying relative to the disk.

Preferably the wear pad of the subject second aspect of the present invention is not an air bearing surface such that the burnishment thereof does not have any affect on the fly height of the slider (e.g., no greater than about 1% of the lift forces exerted on the slider during disk drive operations may be attributed to the presence of the wear pad). Typically the wear pad will be disposed at least substantially at a "trailing edge" of the slider as that term is commonly used in the art. Burnishment of the wear pad is desired, not the air bearing surfaces. This may be affected by disposing the slider at a relatively steep pitch relative to the disk during disk drive operations (e.g., at least about 150 microradians).

The transducer(s) or sensor(s) which is used to read and/or write information from/to the disk may be embedded within the slider before burnishment is undertaken in accordance with the subject second aspect of the present invention. That is, at least some wear pad material initially may be disposed between the sensor(s) and the disk. The method of the subject second aspect may further include burnishing the wear pad until there is no longer any wear pad material between the sensor(s) and the disk. Another way of characterizing this feature of the subject second aspect is that the wear pad is burnished so as to eventually expose the sensor(s) to the air gap which exists between the slider and disk during disk drive operations after what may be characterized as an initialization operation of sorts for the disk drive. Wear pad material may be burnished away in accordance with the foregoing, as well as an overcoat that is typically disposed on the lower surface of the slider at the completion of the manufacturing thereof.

Burnishment of the wear pad in accordance with the subject second aspect may be monitored in at least some respect. For instance, a read/write signal between the sensor(s) and the disk will include "noise" or other "spikes" while there is contact between the slider and the disk. When the gap is defined between the slider and the disk by the subject burnishment, this "noise" will no longer be evident in the signal between the sensor(s) and the disk. This may be used as an indication that the burnishing operation may be terminated. In this regard, the burnishment of the wear pad in accordance with the subject second aspect will typically be done at the manufacturer's facilities. By monitoring the above-noted signal, the point in time when the gap is initially established between the entirety of slider and the disk may be identified such that the current operation may be terminated. Relatedly, after the wear pad has been burnished in accordance with the second aspect of the invention, the disk drive may be released for distribution (e.g., to consumers or end users), although other tests or the like may first need to be executed.

The burnishing operation of the subject second aspect may be executed rather expediently so as to not significantly add to the time required to prepare a disk drive for release for distribution to consumers. In one embodiment, a gap may be established between the slider and the disk in no more than about 60 minutes, and in another embodiment in no more than about 10 minutes. This fast burnishing may be facilitated by forming the wear pad from a relatively soft material in comparison to the air bearing surface(s) which are also disposed on the lower surface of the slider (e.g., the hardness of the portion of the slider which is the wear pad may have a smaller hardness value than those portions of the slider which define the air bearing surfaces). Appropriate materials for the wear pad include alumina, while appropriate materials for the air bearing surfaces used by the slider include ceramics such as a composition of alumina and titanium carbide.

A third aspect of the present invention is embodied in a method for operating a disk drive which includes a rigid disk and a slider. The slider includes at least one transducer which operatively interfaces with the disk to read and/or write information from/to the disk, as well as at least one air bearing surface and a wear pad which are disposed on a lower surface of the slider which at least generally projects toward the disk during disk drive operations. The method of the third aspect includes initializing the disk drive. Initialization of the disk drive includes rotating the disk relative to the slider and exerting a lifting force on the slider by the action of the air associated with the rotating disk on the air bearing surface(s) of the slider. During this initialization operation there is contact between the wear pad and the disk at least at some point in time. This contact and the relative movement between the disk and the slider burnishes the wear pad. Sufficient burnishment of the wear pad establishes a typically small gap between the slider and the disk, and thereafter there is no longer any substantial burnishment of the wear pad. That is, once the initialization operation is complete, there is no longer any substantial burnishment of the wear pad. At least one data transfer operation is executed after the disk drive has been initialized in accordance with the foregoing, although data transfer operations could be executed during the initialization procedure as well. Data transfer operations are affected by rotating the disk relative to the slider, maintaining a gap between the slider and a disk which again was provided by the burnishment of the wear pad in the initialization procedure, and exchanging at least one signal between at least one of the transducer(s) carried by the slider and the disk. The various features discussed above in relation to the second aspect of the present invention may be incorporated in this third aspect of the present invention as well, and in the manner noted above.

A fourth aspect of the present invention is embodied in a method for operating a disk drive which includes a rigid disk and a slider. The slider includes at least one transducer which operatively interfaces with the disk to read and/or write information from/to the disk, as well as at least one air bearing surface and a wear pad which are disposed on a lower surface of the slider which at least generally projects toward the disk during disk drive operations. Notably, this transducer is initially embedded within the wear pad. The method of the fourth aspect includes the steps of rotating the disk, burnishing the wear pad at least at some point in time during this rotation, exposing the noted transducer through this burnishing operation, and flying the slider relative to the disk during the rotation thereof. The exposure of the noted transducer means that there is no structural material between the transducer and disk. Stated another way, the transducer directly interfaces with the air gap between the slider and the disk. The various features discussed above in relation to the second aspect of the present invention may be incorporated in this fourth aspect of the present invention as well, and in the manner noted above.

A fifth aspect of the present invention is embodied in a slider for a disk drive which includes a rigid disk. The slider of the subject fifth aspect is of the "flying type." In this regard, the slider includes a slider body which may be characterized as extending along a reference axis to define a longitudinal extent of the slider body. The slider body includes upper and lower surfaces, with the lower surface at least generally projecting toward the disk of the disk drive when installed therein. The slider body further includes a leading edge and trailing edge as those terms are commonly used in the art and which would be longitudinally spaced relative to the above-noted reference axis. Other portions of the slider body include a pair of sides which are laterally spaced relative to the above-noted reference axis and which extend longitudinally between the leading and trailing edges.

The lower surface of the slider of the subject fifth aspect is designed to have a significantly reduced fly height in comparison to the prior art, and which is typically only slightly more than the glide height as that term is commonly used in the art. In this regard, the lower surface includes a wear pad which is disposed at least substantially at the trailing edge of the slider body, at least one transducer which is carried by this wear pad, and an air bearing surface system (i.e., one or more air bearing surfaces). In one embodiment, the wear pad is separate from and is not part of the air bearing surface system. That is, rotation of the disk relative to the slider of the subject forth aspect of the present invention generates substantially no lifting forces on the slider through the noted wear pad.

Various refinements exist of the features noted in relation to the subject fifth aspect of the present invention. Further features may also be incorporated in the subject fifth aspect of the present invention as well. These refinements and additional features may exist individually or in any combination. The wear pad of the fifth aspect is disposed at least substantially adjacent to the trailing edge of the slider body. In this regard and in one embodiment, the wear pad is disposed about 0.0004 inches from the trailing edge of the slider body. Preferably the wear pad is centrally disposed between the pair of laterally-spaced sides of the slider body. Portions of the lower surface of the slider body which surround the wear pad may be recessed in relation to the wear pad such that the wear pad extends further toward the disk then these adjacent portions (e.g., the wear pad may be characterized as an island of sorts). Relatedly, a recess may be disposed in front of the wear pad (i.e., in the direction of the leading edge of the slider body) and may be of a depth such that the wear pad does not function as an air bearing surface for the slider.

Characterization of the wear pad as such is not necessarily meant to functionally define the wear pad for all-time. Instead, the wear pad of the subject fifth aspect may indeed function as a wear pad between the slider and the disk during only an initial portion of disk drive operations and in a manner contemplated by the first, second, and fourth aspects noted above. That is, after an initial burnishing of the wear pad the first time the disk drive is operated, the function of the wear pad is effectively limited to being a carrier for the transducer(s) for operatively interfacing with the disk (e.g., a structure on which the transducer(s) is mounted).

The air bearing surface system of the subject fifth aspect may include a first air bearing surface. This first air bearing surface may be disposed relatively close to the wear pad. In one embodiment, this first air bearing surface and the wear pad are separated by the above-noted recess which provides non-air bearing surface characteristics for the wear pad. Preferably the first air bearing surface and the wear pad are spaced by a distance of no more than about 0.010 inches, and in one embodiment are spaced by a distance of about 0.003 inches, as measured along a line which is parallel with the above-noted reference axis which again defines the longitudinal extent of the slider. Stated another way, the first air bearing surface and the wear pad are spaced by a distance which is within a range of about 5% to about 20% of the length of the slider. Another characterization of the "closeness" of the noted first air bearing surface and the wear pad is that they may be characterized as being disposed on the same half of the slider body. "Half" in this context is in relation to the longitudinal extent of the slider body, or the half-way point between the leading edge and trailing edge of the slider body. Therefore, in the subject characterization both the wear pad and the first air bearing surface would be disposed on that part of the lower surface of the slider body which extends from the trailing edge to the longitudinal midpoint of the slider body. Other air bearing surfaces may be disposed on this half as well and/or one or more air bearing surfaces may be disposed on the opposite half of the slider body as well (e.g., more toward the leading edge).

DESCRIPTION OF EMBODIMENTS

The present invention will now be described in relation to the accompanying drawings which least assist in illustrating its various pertinent features. One embodiment of a disk drive 132 which may utilize principles of the present invention is presented in FIG. 1. The disk drive 132 includes one or more typically horizontally disposed disks 136 which will typically be disposed in spaced and parallel relation. Each disk 136 preferably includes one, and possibly a pair of opposingly disposed, read/write surfaces 152 on which information may be stored and retrieved. Another portion of each disk 136 is a landing zone 154 for the case where the disk drive 136 is of a contact start/stop type design. One way to characterize these disks 136 is as a computer-readable storage medium (e.g., having a plurality of concentrically disposed tracks on each of the read/write surfaces 152). The disk(s) 136 is mounted on typically an at least generally vertically disposed spindle 174 for rotation about an axis 156 which is coincident with the spindle 174.

Information may be read from one or more of the disks 136, and preferably written to these disks 136, by a read/write assembly or head positioner assembly 158 of the disk drive 132. The read/write assembly 158 includes an actuator arm or actuator block 160 (e.g., "E-block") which is pivotally interconnected with the support structure of the disk drive 132 (e.g., its encasement) via a hub 162. Typically the actuator arm 160 is designed as a rigid structure such that there is at least substantially no deflection of the actuator arm 160 or any portion thereof under normal operating conditions. Movement of the actuator arm 160 is affected through a rotary actuator 166 which includes a coil 168 mounted on the actuator arm 160 and a magnet 170 which is maintained in fixed relation relative to the actuator arm 160. This arrangement is commonly referred to as a voice coil or a voice coil motor.

Extending from the actuator arm 160 is at least one load beam 164 which is appropriately interconnected with the actuator arm 160 (e.g., via staking of the load beam(s) 164 to an actuator arm tip on the actuator arm 160). One load beam 164 will be provided for each of the read/write surfaces 152 utilized by the disk drive 132. Each load beam 164 includes a hinge/spring assembly (not shown) to bias the load beam 164 toward its corresponding disk 132 and for allowing controlled flexure of the load beam 164 during operation of the disk drive 132. Disposed on an end portion of each of the load beams 164 is a head or head gimble assembly 172 which is able to read information from the corresponding disk 132, and preferably which is further capable of writing information to this disk 132 as well. Flexure of the load beam(s) 164 through their corresponding hinge/spring assembly is utilized to allow their corresponding head 172 to move away from their corresponding disk 132 to a predetermined position of sorts or to accurately maintain the fly height of the head 172 (i.e., distance of the head(s) 172 from their corresponding disk 132) during operation of the disk drive 132. Both the rotational speed of the disk(s) 132 (which directs the head(s) 172 away from their corresponding disk 132) and the flexure of the corresponding load beam 164 through its hinge/spring assembly (which again biases the corresponding head 164 towards the disks 132) cooperate to determine the fly height of the head(s) 172.

Figure 4:
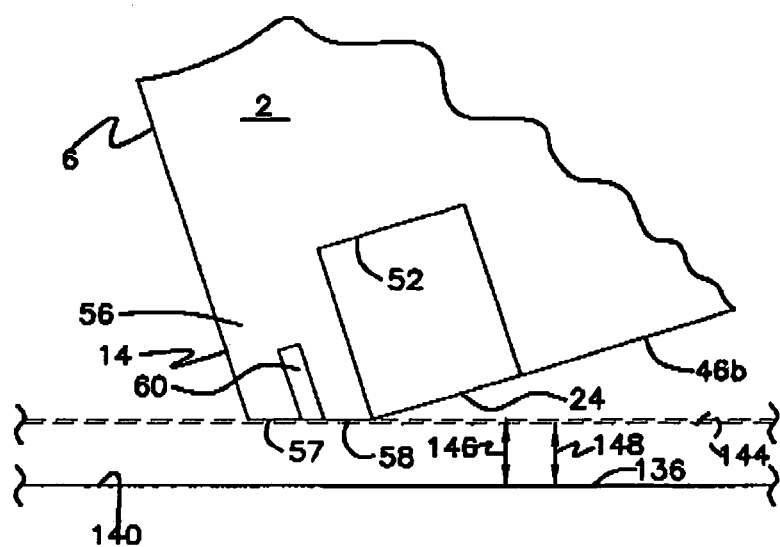
FIG. 4 is a partial, longitudinal cutaway view of the slider of FIG. 3 after the burnishing operation on the rear wear pad of the slider has been completed.
Figure 2:
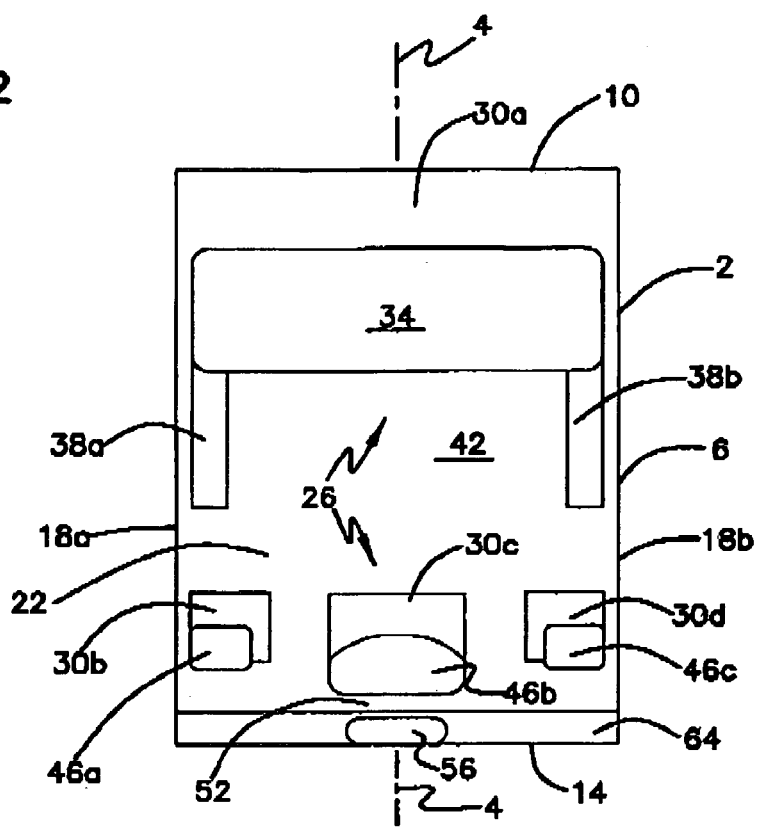
FIG. 2 is a bottom view of one embodiment of a slider which may be used by the disk drive of FIG. 1, namely for a contact start/stop type design.
Figure 3:
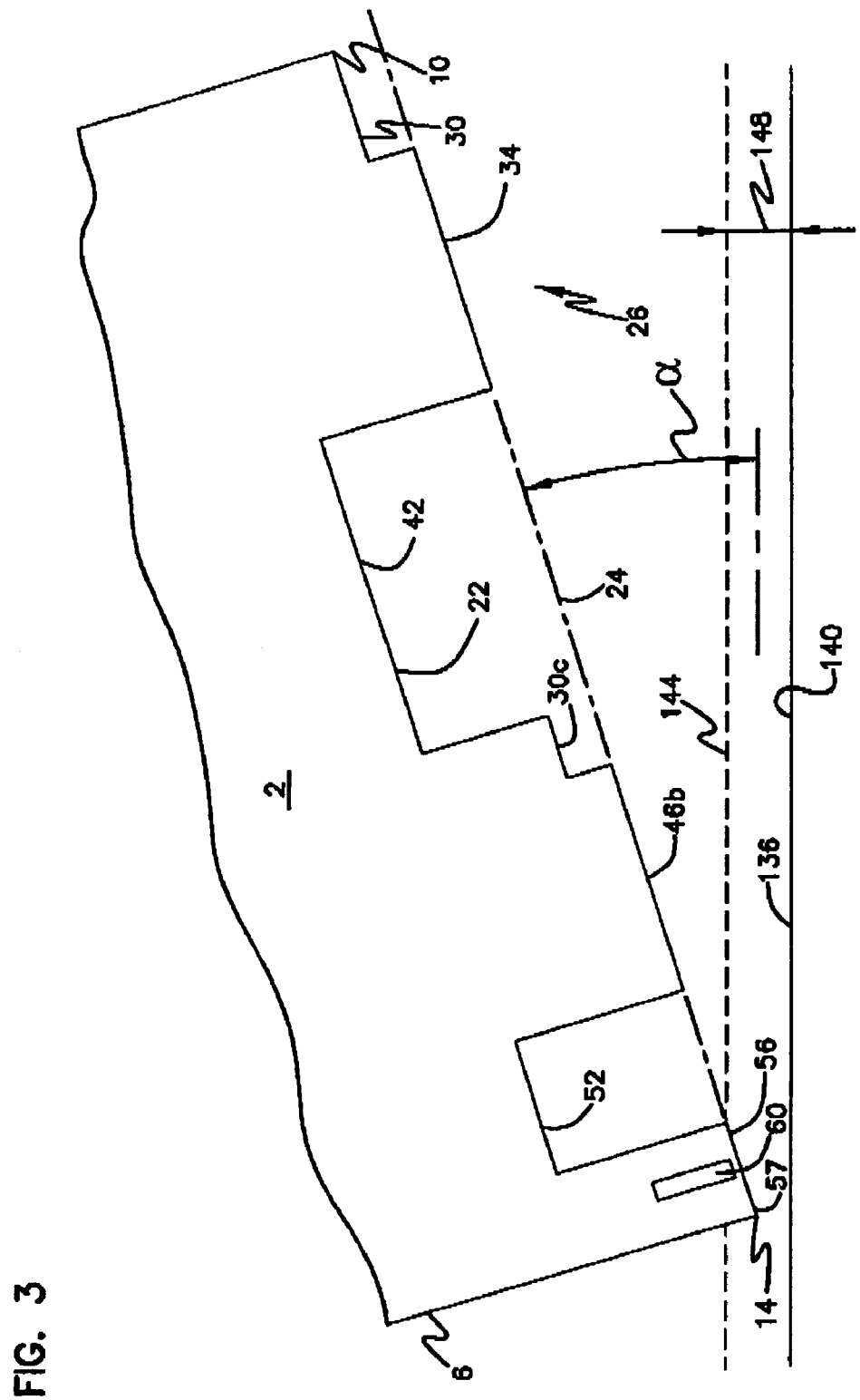
FIG. 3 is a longitudinal cutaway view of the slider of FIG. 2 prior to conducting a burnishing operation on a rear wear pad of the slider.

FIGS. 2–4 depict a slider 2 which may be used by the head 172 of the disk drive 132 of FIG. 1. The slider 2 is designed for use with contact start/stop type designs. The slider 2 includes a slider body 6 which has a longitudinal extent along a central reference axis 4. Hereafter in relation to the slider 2 the term "longitudinal" or the like means in a direction which is parallel with this reference axis 4, while the term "lateral" or the like means a direction which is perpendicular with this reference axis 4. An at least generally rectangular configuration or profile is utilized by the slider body 6. In this regard, the slider body 6 includes: a leading edge 10 which is laterally extending; a trailing edge 14 which is laterally extending and which is longitudinally spaced from the leading edge 10 (i.e., spaced from the leading edge 10 along the reference axis 4); and a pair of sides 18a and 18b which are laterally spaced and extend longitudinally between the leading edge 10 and trailing edge 14. Orientations for the leading edge 10, the trailing edge 14, and the sides 18a, 18b which differ from that illustrated in FIG. 2 may be appropriate (e.g., a square configuration).

The slider body 6 includes a lower surface 22 which at least generally projects toward its corresponding disk 136 when installed in the disk drive 132. Features are incorporated in the design of the lower surface 22 of the slider 2 such that its fly height is significantly smaller than current state-of-the-art slider designs, and is only slightly in excess of the glide height 148 (e.g., FIG. 4). Spacing between the slider 2 and the disk 136 is maintained during normal disk drive operations (e.g., reading/writing information from/to the disk 136) by including an air bearing surface or ABS system 26 on the low surface 22 of the slider body 6. The ABS system 26 includes a front air bearing surface or ABS pad 34 which has an at least generally rectangular profile. The front ABS pad 34 is longitudinally spaced from the leading edge 10 and extends at least substantially from the side 18a of the slider body 6 to the side 18b. A small space is typically included between the front ABS pad 34 and each of the sides 18a, 18b in the illustrated embodiment for manufacturing purposes. All of the front ABS pad 34 is disposed on the forward half of the slider body 6 (i.e., the front ABS pad 34 is disposed between the leading edge 10 of the slider body 6 and the longitudinal midpoint of the slider body 6).

Air carried by the rotating disk 136 is directed under the front ABS pad 34 to exert an upwardly directed lifting force thereon via an ABS step 30a. The ABS step 30a is disposed forward of the front ABS pad 34, or in the direction of the leading edge 10, such that the ABS step 30a is disposed between the leading edge 10 and the front ABS pad 34. As illustrated in FIG. 3, the front ABS pad 34 may be characterized as being disposed within a reference plane 24. The ABS step 30a is recessed relative to this reference plane 24 by a distance which allows the front ABS pad 34 to function as an air bearing surface.

A pair of longitudinally extending and laterally spaced rails 38a, 38b extend from the rear of the front ABS pad 34 toward, but not to, the trailing edge 14 of the slider body 6. These rails 38a, 38b are also slightly spaced from the sides 18a and 18b, respectively, in the same manner as the front ABS pad 34. The rails 38a, 38b terminate at least generally proximate the longitudinal midpoint of the slider body 8 and are recessed relative to the reference plane 24 as well, although not to the same extent as the ABS step 30a. An ABS cavity 42 is defined by the rails 38a, 38b and the front ABS pad 34. Air which flows over the front ABS pad 34 flows over the ABS cavity 42 to generate a negative pressure therein which may be used to have an effect upon and/or control the flight of the slider 2. Those portions of the lower surface 22 which define the bottom of the ABS cavity 42 are recessed relative to the reference plane 24, and thereby relative to the front ABS pad 34, by an amount which is sufficient so as to allow the noted negative pressure to be generated therein.

A plurality of rear air bearing surfaces or ABS pads 46a–c are longitudinally spaced from the front ABS pad 34, and are separated therefrom by the ABS cavity 42. The rear ABS pad 46b is centrally disposed between the sides 18a and 18b of the slider body 6 (e.g., the reference axis 4 bisects the rear ABS pad 46b). The rear ABS pad 46a is laterally spaced from the rear ABS pad 46b in that it is disposed at least generally between the side 18a and the rear ABS pad 46b. Similarly, the rear ABS pad 46c is laterally spaced from the rear ABS pad 46b in that it is disposed at least generally between the side 18b and the rear ABS pad 46b. The rear ABS pads 46a and 46b are slightly longitudinally spaced from the rear ABS pad 46b in the direction of the leading edge 10 to provide roll stiffness for the slider 2. Air carried by the rotating disk 136 is directed under the rear ABS pads 46a, 46b, and 46c to exert an uplifting force thereon by corresponding ABS steps 30b, 30c, and 30d, respectively. The ABS steps 30b, 30c, and 30d are disposed forward of their corresponding rear ABS pad 46a, 46b, and 46c, respectively, or in the direction of the leading edge 10, such that the ABS steps 30b, 30c, and 30d are disposed between the leading edge 10 and the corresponding rear ABS pad 46a, 46b, and 46c, respectively. The steps 30b and 30c also extend around and along most of the inside edge (i.e., the side of the pads 46a and 46c which is closest to the reference axis 4) of their corresponding rear ABS pad 46a and 46c, respectively. As illustrated in FIG. 3, the rear ABS pads 46a, 46b, and 46c may also be characterized as being disposed within the reference plane 24. The ABS steps 30b, 30c, and 30d are each recessed relative to this reference plane 24 by a distance which allows the rear ABS pad 46a–c to function as air bearing surface surfaces.

Located at least substantially at the trailing edge 14 of the slider body is a rear rail 64. The rear rail 64 is longitudinally spaced from each of the rear ABS pads 46a–c, extends laterally between the sides 18a and 18b, and is recessed relative to the reference plane 24. Centrally disposed on the rear rail 64 is a wear pad 56 which carries at least one transducer 60 of a head for reading information from and/or writing information to the disk 136 in a manner known in the art (e.g., through sending signals between the transducer(s) 60 and the disk 136, such that there is an operative interface of sorts therebetween). Representative transducers 60 include magneto resistive (MR), giant magneto resistive (GMR), collosal MR, and older inductive transducers.

Prior to initialization of the disk drive 132, the wear pad 56 is contained within the above-noted reference plane 24 (FIG. 3), and is thereby co-planar with the rear ABS pads 46a–c and the front ABS pad 34. Burnishing operations are executed on the wear pad 56 when the disk drive 132 is initially operated so as to remove portions of the wear pad 56. Therefore, preferably the wear pad 56 is formed from a softer material than those which formed the front ABS pad 34 and the rear ABS pads 46a–c. In one embodiment, that portion of the slider body 6 which includes the front ABS pad 34 and the rear ABS pads 46a–c is formed from materials such as $Al_2O_3$—TiC or other appropriate ceramics, while the material which forms the wear pad 56 is formed from materials having a reduced hardness, such as $Al_2O_3$.

Substantially no uplifting forces are applied to the slider 2 by the wear pad 56 (e.g., no more than about 1% of the uplifting forces exerted on the slider 2 are due to the wear pad 56). At no time does the wear pad 56 thereby function as an air bearing surface. This non-air bearing surface effect is provided by disposing a recess 52 between the wear pad 56 and the rear ABS pad 46b. One of the characteristics of the recess 52 that allows the wear pad 56 to initially be coplanar with the front ABS pad 34 and the rear ABS pads 46a–c, and yet still not exert any substantial uplifting forces on the slider 2 is the depth of the recess 52 or the degree of offset from the reference plane 24. Typically the depth of the recess 52 must be at least about 600 nanometers in order for the wear pad 124 to be a non-air bearing surface in the manner described herein. Other characteristics which at least contribute to the wear pad 56 being a non-air bearing surface is its small size which also reduces the time to burnish the same. In one embodiment, the wear pad 56 contributes no more than about 1–2% of the total lift forces exerted on the slider 2 when flying.

There are a number of other characteristics or features which are important in relation to the slider 2. One is the pitch angle at which the slider 2 is disposed when installed in the disk drive 132 and which is represented by the angle α in FIG. 3. Generally, the pitch angle α is selected such that the wear pad 56 will at least at some point in time be in contact with the disk 136, and such that the front ABS pad 34 and the rear ABS pads 46 are never in contact with the disk 132. Another characteristic is that the rear ABS pads 46a–c and the wear pad 56 are disposed on the same half of the lower surface 22 of this latter body 6. Both the rear wear pads 46a–c and the rear wear pad 56 are disposed between a longitudinal midpoint of the slider body 6 (i.e., half-way between the leading edge 10 and the trailing edge 14) and the trailing edge 14 of the slider body 6. The wear pad 56 and the rear ABS pad 46b are also disposed relatively close to each other. In one embodiment, the rear wear pad and the rear ABS pad 46 are separated by a distance of no more than about 0.010 inches (as measured along the to reference axis 4). As noted above, the wear pad 56 is disposed at least substantially at the trailing edge 14 of the slider body 6. In one embodiment, the trailing edge 14 and the wear pad 56 are separated by a distance of about 0.0004 inches, the transducer 60 and the trailing edge 14 are separated by a distance of about 0.0011 inches, the rear ABS pad 46b and the trailing edge 14 or separated by distance of about 0.005 inches, and the rear ABS pad 46b and the wear pad 56 are separated by a distance of about 0.003 inches. Stated another way, preferably the rear ABS pad 46b and the wear pad 56 are separated by a distance which is no more than about 20% of a distance between the leading edge 10 and the trailing edge 14 of the slider body 10, and in one embodiment are separated by a space which is about 5% of a distance between the leading edge 10 and the trailing edge 14 of the slider body 6.

Characterizing the pad 56 as a "wear pad" is not meant to describe the function of the pad 56 for all time. There is no contact between the wear pad 56 and the disk 136 during disk drive operations after the disk drive 132 has undergone an initialization procedure which is on the initial start-up of the disk drive 132, and therefore at least at this time the pad 56 does not provide a "wear" function. Even when there is contact between the wear pad 56 and the disk 136, the primary function of the wear pad 56 is not primarily to protect the slider 2 and/or the disk 136 from this type of situation, but instead is to achieve a reduced fly height 146 for the slider 2 which is greater than the glide height 148. In this regard, when the disk drive 132 is initially assembled and for the subject contact start/stop design, the wear pad 56 will be disposed directly on typically the data portion of the disk 136. Prior to releasing the disk drive 132 for distribution (e.g., to consumers), the disk drive 132 will undergo an initialization procedure on the first start-up of the disk drive 132. The initialization procedure entails rotating the disk 136 to burnish the wear pad 56 to achieve a reduced fly height 146 which is greater than the glide height 148. Both the fly height 146 and glide height 148 are measured relative to a reference plane 140 which corresponds with a mean of the surface roughness of the disk 136. In one embodiment and when the disk 136 has a diameter of about 95 mm, the disk 136 is rotated at a velocity of about 5400 rpm for the subject initialization procedure. Different speeds may be used for the initialization procedure and normal disk drive operations, or the same rotational speed may be used.

At the time of the subject initialization procedure, the uplifting forces being exerted on the front ABS pad 34 and the rear ABS pads 46a–c are insufficient to dispose the entirety of the wear pad 56 above the glide height 148 or above the glide avalanche 144 of the disk 136, and in one embodiment the entire distal end or lower extreme 57 of the wear pad 56 is disposed below the glide avalanche 144 of the disk 136. Continued rotation of the disk 136 with the wear pad 56 in this position causes the roughness of the upper surface or the glide avalanche 144 of the disk 136 to burnish the wear pad 56 or remove portions of the material which define the wear pad 56. Burnishing of the wear pad 56 will continue until a burnished surface 58 of the wear pad 56 is disposed above the glide height 148 or glide avalanche 144 of the disk 136. With the wear pad 56 being formed from the above-noted types of materials, the time required to burnish the wear pad 56 to the point where the fly height 146 of the slider exceeds the glide height 148 to achieve separation between the entirety of the slider 2 and the disk 136 during disk drive operations is relatively quick, and in one embodiment takes no more than about 10 minutes.

Burnishing of the wear pad 56 during the initialization procedure allows the entirety of the slider 2 to fly a distance above the disk 132 which is very close to, but slightly in excess of the glide height 148. This reduced spacing is advantageous for the transfer of signals between the transducer 60 and the disk 132 for read/write operations. Other benefits are provided by the burnishment of the wear pad 56 during the initialization procedure for the disk drive 132. One is that the burnished surface 58 of the wear pad 56 (after the burnishing operation) is customized in that the very disk 136 with which the slider 2 is to be used is what does the burnishing. Burnishing of the wear pad 56 by its corresponding disk 136 also provides a burnished surface 58 thereof which is at least substantially co-planar with the disk 136. Another benefit which may be realized through the initialization procedure described herein is that the burnishing of the wear pad 56 may be continued so as to dispose the transducer 60 at the burnished surface 58 of the wear pad 56. Stated another way, burnishing may proceed to the point where the initially embedded transducer 60 is exposed to the air gap between the slider 2 and disk 136 during disk drive operations. This provides a reduced pole-tip recession for the slider 2. In cases where an overcoat (e.g., carbon) is provided on the entirety of the lower surface 22 of the slider 2, the burnishing operation may be utilized to remove at least part of this overcoat, and possibly the entirety of that portion of the overcoat between the transducer 60 and the disk 136.

Figure 5:
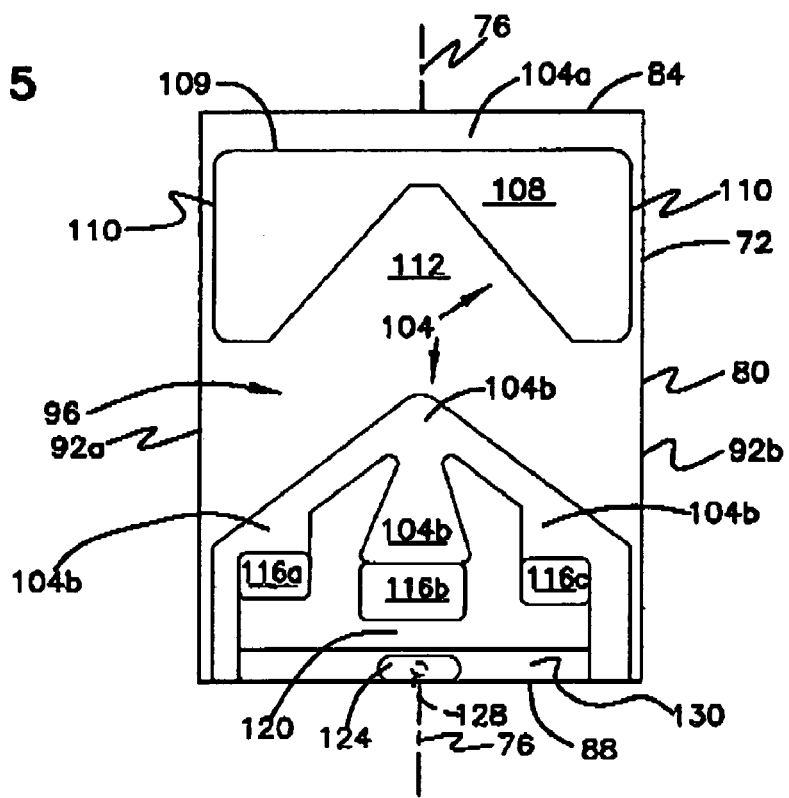
FIG. 5 is a bottom view of another embodiment of a slider which may be used by the disk drive FIG. 1, namely for a load/unload type design.

Another embodiment which is functionally the same as the slider 2 discussed above, but which is for the case where the disk drive 132 utilizes a load/unload-type design, is illustrated in FIG. 5 in the form of a slider 72. The slider 72 includes a slider body 80 which has a longitudinal extent along a central reference axis 76. Hereafter in relation to the slider 72, the term "longitudinal" or the like means in a direction which is parallel with this reference axis 76, while the term "lateral" or the like means a direction which is perpendicular with this reference axis 76. An at least generally rectangular configuration or profile is utilized by the slider body 80. In this regard, the slider body 80 includes: a leading edge 84 which is laterally extending; a trailing edge 88 which is laterally extending and which is longitudinally spaced from the leading edge 84 (i.e., spaced from the leading edge 84 along the reference axis 76); and a pair of sides 92a and 92b which are laterally spaced and extend longitudinally between the leading edge 84 and trailing edge 88. Orientations for the leading edge 84, the trailing edge 88, and the sides 92a, 92b which differ from that illustrated in FIG. 5 may be appropriate.

The slider body 80 includes a lower surface 96 which at least generally projects toward its corresponding disk 136 when installed in the disk drive 132. Features are incorporated in the design of the lower surface 96 of the slider 72 such that its fly height is significantly smaller than current state-of-the-art slider designs. Spacing between the slider 72 and the disk 136 is maintained during normal disk drive operations (e.g., reading/writing information from/to the disk 136) by including an air bearing surface or ABS system 100 on the lower surface 96 of the slider body 80. The ABS system 100 includes a front air bearing surface or ABS pad 108. The front ABS pad 108 is longitudinally spaced from the leading edge 84 and extends at least substantially from the side 92a to the side 92b. A small space is included between the front ABS pad 108 and each of the sides 92a, 92b for manufacturing purposes.

The profile of the front ABS pad 108 from a top view differs from the front ABS pad 34 used by the contact-start/stop design of FIGS. 2–4 presented above. The longitudinal extent of the front ABS pad 108 of the slider 72 is greater than that of the front ABS pad 34 of the slider 2. However, the entirety of the front ABS pad 108 is still disposed between the longitudinal midpoint of the slider body 80 (i.e., half-way between the leading edge 84 and trailing edge 88) and its leading edge 84. Another distinction is that the rear portion of the front ABS pad 108 includes an at least generally v-shaped portion whose apex projects toward the leading edge 84 of the slider body 80.

Air carried by the rotating disk 136 is directed under the front ABS pad 108 to exert an uplifting force thereon by an ABS step 104a. The ABS step 104a is disposed forward of the front ABS pad 108, or in the direction of the leading edge 84, such that the ABS step 104a is disposed between the leading edge 84 and the front ABS pad 108. The ABS step 104a is recessed relative to the front ABS pad 108 an amount such that the front ABS pad 108 will function as an air bearing surface. An ABS cavity 112 is defined by the at least generally v-shaped of the rear of the front ABS pad 108. Air which flows over the front to ABS pad 108 flows over the ABS cavity 112 to generate a negative pressure therein which may be used to have an effect upon and/or control the flight of the slider 72. Those portions of the lower surface 96 which defined the bottom of the ABS cavity 112 are recessed relative to the front ABS pad 108 an amount which is sufficient so as to allow the noted negative pressure to be generated therein.

A plurality of rear air bearing surface or ABS pads 116a–c are longitudinally spaced from the front ABS pad 108, and are separated therefrom by the ABS cavity 112. The rear ABS pad 116b is centrally disposed between the sides 92a and 92b of the slider body 80 (e.g., the reference axis 76 bisects the rear ABS pad 116b). The rear ABS pad 116a is laterally spaced from the rear ABS pad 116b in that it is disposed at least generally between the side 92a and the rear ABS pad 116b. Similarly, the rear ABS pad 116c is laterally spaced from the rear ABS pad 116b in that it is disposed at least generally between the side 92b and the rear ABS pad 116b. The rear ABS pads 116a and 116c are slightly longitudinally spaced from the rear ABS pad 116b in the direction of the leading edge 84 to provide roll stiffness for the slider 72.

Air carried by the rotating disk 136 is directed under the rear ABS pads 116a, 116b, and 116c to exert an uplifting force thereon via a constant depth ABS step 104b. The leading portion of the ABS step 104b is disposed forward of each of the rear ABS pad 116a, 1166b, and 116c, or in the direction of the leading edge 84, such that the leading portion of the ABS step 104b is disposed between the leading edge 84 and each of the ABS pad 116a, 116b, and 116c. Three separate legs of the ABS step 104b extend to the three rear ABS pads 116a, 116b, and 116c. The ABS step 104b also extends longitudinally from the rear wear pads 116a and 116c to the trailing edge 88 of the slider body 80 in slightly spaced relation from the sides 92a and 92b of the slider body 80. No portion of the ABS step 104b extends rearwardly from the rear ABS pad 116b such that the ABS step 104b terminates at the ABS pad 116b. The ABS step 104b is recessed relative to the rear ABS pads 116a, 116b, and 116c by an amount such that the rear ABS pads 116a, 116b, and 116c each will function as an air bearing surface.

Located at least substantially at the trailing edge 88 of the slider body is a rear rail 130. The rear rail 130 is longitudinally spaced from each of the rear ABS pads 116a–c, extends laterally between the sides 92a and 92b, and is recessed relative to each of the front ABS pad 108 and the rear ABS pads 116a, 116b, and 116c. Centrally disposed on the rear rail 130 is a wear pad 124 which carries at least one transducer 128 for reading information from and/or writing information to the disk 136 in a manner known in the art (e.g., through sending signals between the transducer(s) 128 and the disk 136 such that there is an operative interface therebetween). The transducer 128 may be of the type discussed above in relation to the slider 2.

Prior to the initial operation of the disk drive 132, the wear pad 124 will be at least substantially co-planar with the rear ABS pads 116a–c and the front ABS pad 108 in the same manner discussed above in relation to the slider 2. Burnishing operations are executed on the wear pad 124 when the disk drive 132 is initialized so as to remove portions of the wear pad 124 in the same manner discussed above relation to the slider 2 as well. Therefore, preferably the wear pad 124 is formed from a softer material than those which formed the front ABS pad 108 and the rear ABS pads 116. The materials and hardness characteristics noted above in relation to the slider 2 may be used by the slider 72 as well.

Substantially no uplifting forces are applied to the slider 72 by the wear pad 124 in the same manner and to the same extent as the slider 2. Therefore, at no time does the wear pad 124 function as an air bearing surface for the slider 72. This non-air bearing surface effect is provided by disposing a recess 120 between the wear pad 124 and the rear ABS pad 116b. One of the characteristics of the recess 120 that allows the wear pad 124 to initially be coplanar with the front ABS pad 108 and the rear ABS pads 116a–c, and yet still not exert any substantial uplifting forces on the slider 72 is the depth of the recess 120 or the degree of offset from the wear pad 124 and rear ABS pads 116a–c. Typically the depth of the recess 120 must be at least about 600 nm in order for the wear pad 124 to be a non-air bearing surface in the manner described herein. Other characteristics which at least contribute to the wear pad 124 being a non-air bearing surface is its small size which also reduces the time to burnish the same. In one embodiment, the wear pad 124 contributes no more than about 1–2% of the total lift forces exerted on the slider 72 when flying.

There are a number of other characteristics or features which are important in relation to the slider 72. One is the pitch angle at which the slider 72 is disposed when installed in the disk drive 132. The same pitch angle for the slider 72 will be selected based upon the same factors discussed above in relation to the slider 2. Another characteristic is that the rear ABS pads 116a–c and the wear pad 124 are disposed on the same half of the lower surface 96 of the slider body 80. Both the rear ABS pads 116a–c and the wear pad 124 are disposed between a longitudinal midpoint of the slider body 80 (i.e., half-way between the leading edge 84 and the trailing edge 88) and the trailing edge 88 of the slider body 80. The wear pad 124 and the rear ABS pad 116b are also disposed relatively close to each other and in the same discussed above in relation to the slider 2.

The above-described slider 2 and 72 each provide a reduced fly height in relation to the known prior art. In one embodiment, the fly height which may be achieved by the sliders 2 and 72 is no more than about 5 nm on a 4 nm disk glide—but not a fixed percentage in future disks (both the fly height and glide avalanche being measured relative to a reference plane 140 which corresponds with the mean of the surface roughness of the disk 136). It is common for current state-of-the art sliders to fly at a height of about 50 nanometers above the disk. This reduced fly height realized by the design of the sliders 2 and 72 may be used to take advantage of higher bit and/or track densities for the disk 136 of the disk drive 132. Less sensitivity to manufacturing and environment tolerances (e.g., step depths, cavity depths, suspension gram load, altitude, and temperature) are also realized by the design of the sliders 2 and 72 since the burnishing operation produces a customized surface of sorts for the interface between the wear pad with the transducer(s) therein and its corresponding rigid disk. Moreover, if for some reason there was some subsequent reduction in the fly height of the slider, the wear pad will simply be burnished an additional amount to once again established the desired small gap between the slider and the disk. It should be appreciated that other air bearing surface configurations/locations could be utilized for the sliders 7 and 72 as long as there was no substantial adverse effect on the noted burnishing of the wear pad as described herein. Moreover, principles discussed herein in relation to the sliders 2 and 72 are applicable to any disk drive which uses at least one rigid disk.

Figure 6:
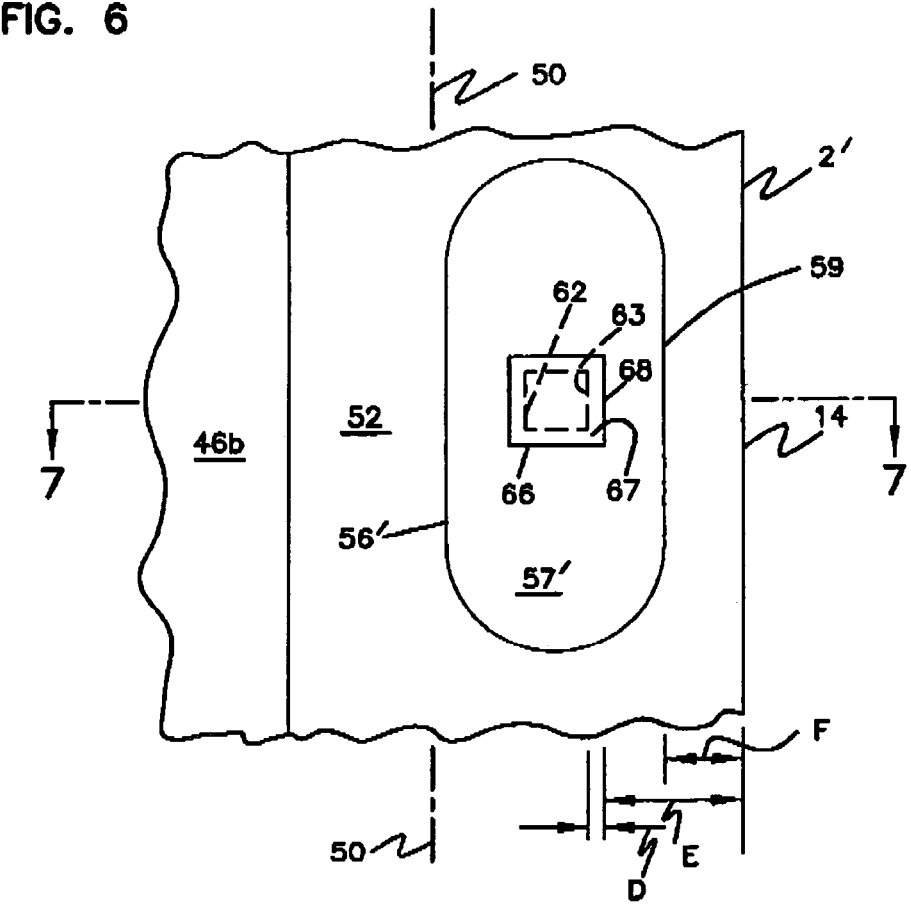
FIG. 6 is a bottom view of an alternative embodiment of the slider of FIG. 2 before being burnished by the initial operation of the disk drive.
Figure 7:
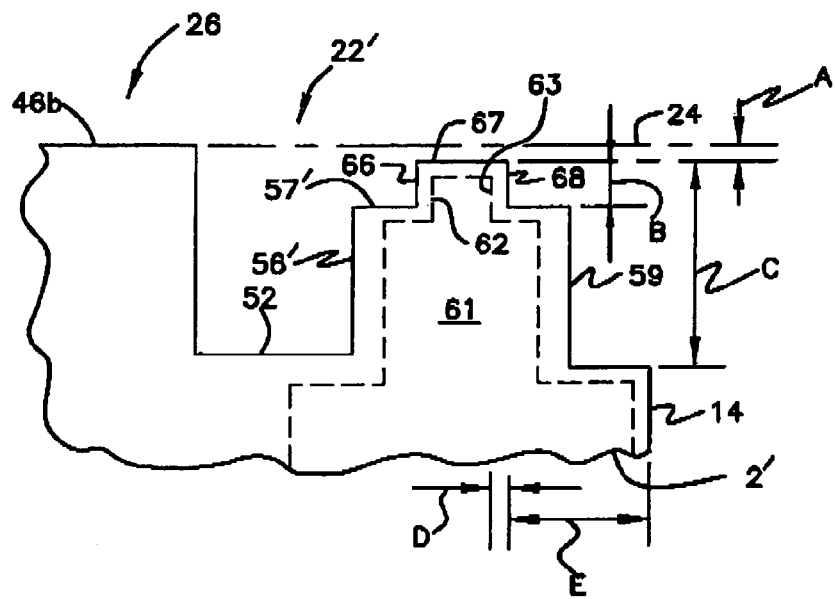
FIG. 7 is a cutaway side view of the slider of FIG. 6 take a long line 7—7.

FIGS. 6–7 present a variation of the slider 2 of FIG. 2. Only those portions that are relevant to the variation will be addressed. Therefore, the discussion presented above with regard to the FIG. 2 embodiment will apply to the embodiment of FIGS. 6–7 unless otherwise noted herein. Common components between the embodiment of FIG. 2 and FIGS. 6–7 are identified by the same reference numeral. Those components of these two embodiments that correspond, but that differ in at least some respect, are identified by a "single prime" designation. The features to be described in relation to the embodiment of FIGS. 6–7 are equally applicable to the slider 72 of FIG. 5, as well as other slider designs of the flying-type.

The principal difference between the slider 2 of FIG. 2 and the slider 2' of FIGS. 6–7 is the addition of a small wear pad or a micropad 66. The micropad 66 is disposed on the lower extreme or distal end or wear pad surface 57' of the wear pad 56' on the lower surface 22' of the slider 2'. The micropad 66 protrudes from adjacent portions of the lower surface 22' of the slider 2'. Generally, the micropad 66 is much smaller than the wear pad 56 of the FIG. 2 embodiment. Therefore, the time required to burnish the micropad 66 to the extent that allows the slider 2' to fly is reduced in relation to the time required to burnish the wear pad 56 to the extent that allows the slider 2 of FIG. 2 to fly. This burnishing occurs on the initial operation of the drive, and before the same is distributed to a consumer. Therefore, this burnishing operation is part of the manufacturing/assembly process for the drive.

The micropad 66 may be disposed at any appropriate location on the distal end 57' of the wear pad 56' (i.e., the micropad 66 need not be located on the wear pad 56'), but should encompass what may be characterized as a sensor region 62 of a head 61. The sensor region 62 of the head 61 is that region that is collectively defined by each sensor component (e.g., transducer 60 noted above in relation to the FIG. 2 embodiment, or more specifically the region occupied by the distal end of read element(s) and the write element(s)) of the head 61 that extends toward the lower surface 22', each of which is typically disposed at or no more than about a few nanometers from the lower surface 22' of the slider 2'. One or more sensor components of the head 61 may be disposed at the lower surface 22' of the slider 2', before burnishing of the micropad 66 (e.g., the configuration of FIG. 7), after burnishing of the micropad 66 (e.g., the configurations of FIGS. 8A–B), or both. The sensor components of the head 61 could be slightly recessed from the distal end 67 of the micropad 66, even after being burnished. In any case, the sensor region 62 may be characterized as protruding into the micropad 66 (e.g., to a location that is beyond the distal end 57' of the wear pad 56' in the direction of the reference plane 24 in which the ABS system 26 is disposed, and in a direction that would intersect with the distal end 67 of the micropad 66).

The micropad 66 protrudes from the distal end 57' of the wear pad 56' and includes its own distal end or wear pad surface 67. The distal end 67 is a planar surface in the illustrated embodiment and that may be disposed within the reference plane 24 that contains the ABS system 26 of the slider 2' (not shown). More typically, the distal end 67 will be parallel with and slightly recessed from this reference plane 24 (represented by dimension "A" in FIG. 7 and due to alumina recession). The distal end 67 of the micropad 66 is thereby vertically spaced from the distal end 57' of the wear pad 56', which is also typically parallel with the reference plane 24. This is represented by the dimension "B" in FIG. 7. One embodiment has the distal end 67 of the micropad 66 and the distal end 57' of the wear pad 56' being vertically spaced by a distance of at least about 1 micro-inch before any burnishing of the micropad 66 (FIG. 7 configuration). Another embodiment has the distal end 67 of the micropad 66 and the distal end 57' of the wear pad 56' being vertically spaced by a distance within a range of about 1 micro-inch to about 3 micro-inches (again, the FIG. 7 configuration) before any burnishing of the micropad 66. Yet another embodiment has the distal end 67 of the micropad 66 and the distal end 57' of the wear pad 56' being vertically spaced by a distance within a range of about 1 micro-inch to about 5 micro-inches (again, the FIG. 7 configuration) before any burnishing of the micropad 66. Having a 5 micro-inch "step" in front of the micropad 66 is somewhat less desirable, as this may provide a certain amount of pressurization on the distal end 67 of the micropad 66.

Therefore, a protrusion of 3 micro-inches or less is preferred for the distal end 67 of the micropad 66 in relation to the portion of the lower surface 22' disposed immediately in front of the micropad 66 for the case when the recess 52 is not disposed immediately in front of the micropad 66.

In the illustrated embodiment, the above-noted vertical separation of the distal end 67 of the micropad 66 from the adjacent portion of the lower surface 22' of the slider 2' is provided about the entire perimeter of the micropad 66. It may be possible for a trailing edge 68 of the micropad 66 to be disposed at a trailing edge 59 of the wear pad 56' or otherwise such that the extent of the protrusion of the micropad 66 in accordance with the foregoing is provided about only a portion of its perimeter. For instance, the above-noted characterizations of the vertical separation would also apply to that portion of the lower surface 22' of the slider 2' that extends from the trailing edge 68 of the micropad 66 to the trailing edge 14 of the slider 2'. That is, the entire lower surface 22' from the trailing edge 68 of the micropad 66 to the trailing edge 14 of the slider 2' may be recessed from the distal end 67 of the micropad 66 by at least about 1 micro-inch before any burnishing of the micropad 66 or otherwise in accordance with the above-noted ranges. In the illustrated embodiment, the distal end 67 of the micropad 66 is actually vertically spaced from that portion of the lower surface 22' that extends from the trailing edge 59 of the wear pad 57' to the trailing edge 14 of the slider 2' by a distance in excess of the 1 micro-inch minimum recess requirement (represented by dimension "C" in FIG. 7). However, the only requirement is that the entirety of the lower surface 22', extending from the trailing edge 68 of the micropad 66 to the trailing edge 14 of the slider 2', be vertically offset from the distal end 67 of the micropad 66 by a distance of at least about 1 micro-inch or otherwise in accordance with the above-noted ranges.

The distal end 67 of the micropad 66 is not part of the ABS system 26 in that it does not contribute in any substantial manner to the total lift forces that are exerted on the slider 2' to allow the same to fly above its corresponding data storage disk during disk drive operations. As noted above, the distal end 57 of the wear pad 56 in the FIG. 2 embodiment is not part of the ABS system 26 because of the existence of the recess 52. The same applies with regard to the distal end 67 of the micropad 66. That is, the existence of the recess 52 also makes the distal end 67 of the micropad 66 a non-air bearing surface for the slider 2'. Preferably, the pressure acting on the micropad 66 is very small, as well as the pressure acting on the lower surface 22' of the slider 2' at its trailing edge 14 (e.g., at or near zero psi). Once again, the recess 52 is of a depth of at least about 600 nanometers to provide this non-air bearing surface effect for at least a portion of the structure on the lower surface 22' of the slider 2' that "trails" the recess 52. The micropad 66 contributes even less to the total lift forces being exerted on the slider 2 when flying than the wear pad 56 discussed above in relation to the FIG. 2 embodiment based upon its smaller size. The recess 52 provides for little to no pressurization at the trailing edge 14 of the slider 2'.

Having the micropad 66 being of a significantly smaller size than the wear pad 56 of the FIG. 2 embodiment reduces the time required to burnish the micropad 66 an amount that allows the slider 2' to fly (generally, to dispose the entire lower surface 22' in spaced relation to the disk 136 during disk drive operations, albeit in closely spaced relation). There are a number of ways to characterize the small nature of the micropad 66. One is that the micropad 66 is sized so as to be the same size as or only slightly larger than the sensor region 62 of the head 61. Specifically, a projection of the sensor region 62 onto the distal end 67 of the micropad 66 is such that the surface area of the distal end 67 is the same size as or only slightly larger than the area of this projection. Generally, the surface area of the distal end 57 of the micropad 66 is preferably large enough to ensure that it encompasses the area of this projection, taking into account mask alignment tolerances, but no larger. Because of mask alignment tolerances, this projection will typically be disposed inwardly from the entire perimeter of the distal end 67 of the wear pad 66 as shown in FIG. 6 by a distance of 5 μm or less. Another way to characterize the small nature of the micropad 66 is that a surface area of the distal end 67 of the micropad 66 (both before burnishing and after burnishing thereof in a manner to be described in more detail below) is no more than about 100 μm$^2$. Yet another characterization of the small size of the micropad 66 is that in one embodiment its trailing edge 68 is disposed no more than about 5 μm from a trailing edge 63 of the sensor region 62, measured parallel with the reference plane 24 in which the ABS system 26 is disposed (corresponding with dimension "D" in FIGS. 6–7).

An etch may be used to define the micropad 66. An area of the distal end 57 of the wear pad 56 of the slider of FIG. 2 that is to correspond with the micropad 66 of the slider 2' of FIGS. 6–7 could be masked. A timed etch could then be done to remove the un-masked portions of the distal end 57 of the wear pad 56 so as to vertically space the distal end 67 of the micropad 66 and the distal end 57' of the wear pad 56' in accordance with the foregoing. It should be appreciated that the etch should be terminated prior to the etch reaching any portion of the head 61 disposed within the wear pad 56'. Any appropriate way of forming the micropad 66 may be utilized.

At least that portion of the micropad 66 that is burnished in order to allow the slider 2' to fly is preferably formed from a softer material that forms other portions of the slider 2'. In one embodiment, that portion of the slider 2' that is disposed from reference plane 50 to the leading edge of the slider 2' is formed entirely from materials such as $Al_2O_3$—TiC or other appropriate ceramics, while that portion of the slider 2' extending from the reference plane 50 to the trailing edge 14 of the slider 14 (excluding the head 61) is formed from a softer material (i.e., of reduced hardness), such as alumina (e.g., $Al_2O_3$). However, a leading portion of the micropad 66 could be formed from $Al_2O_3$—TiC, while a trailing portion of the micropad 66 could be formed from alumina. In this case, the leading portion of the micropad 66 would be raised slightly in relation to a trailing portion of the micropad 66 due to alumina recession, before any burnishing of the micropad 66. The entire micropad 66 could also be formed from $Al_2O_3$—TiC, although this would not be preferred since it would increase the burnishing time.

The micropad 66 could be formed on any appropriate structure on the lower surface 22' of the slider 2' and at any appropriate location. The trailing edge 68 of the micropad 66 may be disposed at the trailing edge 14 of the slider 2', but also maybe spaced from the trailing edge 14 of the slider 2' as shown. For instance, the center of the micropad 66 (in the dimension extending from the trailing edge 14 to the leading edge 10) may be spaced from the trailing edge 14 of the slider 2' by a distance of no more than about 30 microns in one embodiment (corresponding with dimension "E" in FIG. 7, plus one-half of the fore-aft extent of the micropad 66). Before being burnished, the micropad 66 will protrude from that portion of the lower surface 22' of the slider 2' disposed between the trailing edge 68 of the micropad 66 and the trailing edge 14 of the slider 2' by a distance of at least about 1 micro-inch in one embodiment, and by a distance within a range of about 1 micro-inch to about 5 micro-inches in another embodiment (corresponding with dimension "B" in FIG. 7).

The trailing edge 59 of the wear pad 56' is also spaced from the trailing edge 14 of the slider 2' in the direction of the leading edge 10 of the slider 2' (corresponding with dimension "F"), and the trailing edge 68 of the micropad 66 is spaced from the trailing edge 59 of the wear pad 56' in the direction of the leading edge 10 of the slider 2' (the difference between the distances represented by dimension "E" and dimension "F").

The initial fabrication of the slider 2' yields the configuration that is illustrated in FIG. 7, and before the same is used in any disk drive operations. The configuration of the micropad 66 changes during disk drive operations. Generally, at least a portion of the micropad 66 is burnished by the initial operation of a disk drive that uses the slider 2'. This will be described by replacing the slider 2 with the slider 2', and further in relation to FIGS. 3–4. The ABS system 26 of the slider 2' is configured such that it is unable to dispose the entire lower surface 22' of the slider 2' in spaced relation to the disk 136 during the very first or initial operation of the disk drive. That is, the ABS system 26 is unable to dispose the entire lower surface 22' of the slider 2' above the glide height 148 or above the glide avalanche 144 of the disk 136. Therefore, the micropad 66 is in contact with the 136 disk during the initial operation of the drive, and is burnished by this contact. This should be the only portion of the slider 2' that is in contact with the disk 136 during the initial operation of the disk drive. Once the micropad 66 has burnished a sufficient degree, the fluid pressure acting on the ABS system 26 of the slider 2' will then become sufficient to dispose the entire lower surface 22' of the slider 2' in spaced relation to the disk 136 (i.e., the slider 2' will then begin to fly). That is, the micropad 66 will eventually burnish to the degree where the fluid pressure acting on the ABS system 26 will become sufficient to dispose the entire micropad 66 above the glide height 148 or glide avalanche 144 of the disk 136. Once this degree of burnishing has been completed, the micropad 66 will not be burnished to any significant degree in any subsequent disk drive operations, and in any case further burnishing of the micropad 66 should not be required for the slider 2' fly in each such subsequent disk drive operation.

FIGS. 8A and 8B illustrate two possible configurations for the micropad 66 after being burnished to the degree that the slider 2' begins to fly. The configuration of the micropad 66 after being burnished will depend at least in part on the pitch of the slider 2' during disk drive operations. FIG. 8A illustrates that the micropad 66 may be burnished to define a single planar, distally disposed surface 69 that extends from a leading edge 71 of the micropad 66 to its trailing edge 68. This surface 69 is disposed at an angle relative to the reference plane 24 in which the ABS system 26 is disposed. FIG. 8B illustrates that the burnishing of the micropad 66 may burnish only a portion of the distal end 67 of the micropad 66. In this regard, the portion of the micropad 66 that is burnished in the case of FIG. 8B is defined by a planar surface 70b that extends from the trailing edge 68 of the micropad 66 toward, but not to, the leading edge 71 of the micropad 66. This planar surface 70b is disposed at an angle relative to the reference plane 24 in which the ABS system 26 is disposed. Surface 70a is planar and remains parallel with the reference plane 24 in which the ABS system 26 is disposed. Surface 70a corresponds with an unburnished portion of the original distal end 67 of the micropad 66.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive that comprises:
    a data storage disk that comprises a first data storage surface; and
    a head positioner assembly that comprises a slider that extends along a reference axis that defines a longitudinal extent of said slider, wherein said slider comprises:
        upper and lower surfaces, wherein said lower surface projects toward said first data storage surface of said data storage disk;
        a leading edge and a trailing edge which is longitudinally spaced from said leading edge relative to said reference axis, wherein said data storage disk moves relative to said slider in a direction which is at least generally from said leading edge of said slider to said trailing edge of said slider; and
        first and second sides which are laterally-spaced relative to said reference axis, wherein said lower surface of said slider comprises:
            an air bearing surface system disposed within a reference plane; and
            a first wear pad comprising a first wear pad surface that defines a distal end of said first wear pad, wherein said first wear pad surface is separate from and not part of said air bearing surface system, wherein at least a portion of said first wear pad surface is planar and is disposed at an angle relative to said reference plane in which said air bearing surface system is disposed, and wherein said first wear pad surface has a surface area of no more than about 100 $\mu m^2$;
            a second wear pad comprising a second wear pad surface, wherein said first wear pad is disposed on said second wear pad surface, and wherein said first and second wear pad surfaces are vertically offset by a distance of at least about 1 micro-inch; and
    a head carried by said slider and comprising a first sensor component that protrudes toward said first wear pad surface, wherein said first sensor component is disposed at or only slightly recessed from said first wear pad surface.

2. A disk drive, as claimed in claim 1, wherein:
    said air bearing surface system is disposed at an angle relative to said first data storage surface of said data storage disk during disk drive operations.

3. A disk drive, as claimed in claim 1, wherein:
    a trailing edge of said first wear pad is spaced from said trailing edge of said slider.

4. A disk drive, as claimed in claim 1, wherein:
said first wear pad surface is vertically offset from a portion of said lower surface extending from said first wear pad to said trailing edge of said slider by at least about 1 micro-inch.

5. A disk drive, as claimed in claim 1, wherein:
a first portion of said lower surface next to said first wear pad is vertically spaced from said first wear pad surface by a distance within a range of about 1 micro-inch to about 5 micro-inches.

6. A disk drive, as claimed in claim 1, wherein:
a sensor region of said head is an area occupied by that portion of said head that is disposed closest to said first wear pad surface within said first wear pad, wherein said first wear pad is sized so as encompass said sensor region.

7. A disk drive, as claimed in claim 6, wherein:
said surface area of said first wear pad surface is only large enough to encompass an area of said sensor region when projected onto said first wear pad surface, accounting for mask alignment tolerances.

8. A disk drive, as claimed in claim 1, wherein:
a first portion of said second wear pad extending from a first longitudinal location toward said leading edge is a first material of a first hardness, wherein a second portion of said second wear pad extending from said first longitudinal location toward said trailing edge comprises a second material of a second hardness that is less than said first hardness.

9. A disk drive, as claimed in claim 8, wherein:
said first wear pad comprises said second material.

10. A disk drive, as claimed in claim 9, wherein:
said second material comprises alumina.

11. A disk drive, as claimed in claim 1, wherein:
said slider comprises a first material of a first hardness and a second material of a second hardness that is less than said first hardness, wherein at least a portion of said air bearing surface system is defined by said first material, and wherein said first wear pad comprises said second material.

12. A disk drive, as claimed in claim 1, wherein:
said lower surface of said slider comprises a recess disposed in front of said first wear pad in a direction of said leading edge of said slider, wherein said recess has a depth of at least about 600 nm.

13. A disk drive, as claimed in claim 1, wherein:
said first wear pad is at least substantially centrally disposed between said first and second sides of said slider.

14. A disk drive, as claimed in claim 1, wherein:
a trailing edge of said first wear pad and a portion of said head that is disposed closest to said first wear pad surface are spaced by a distance of no more than about 5 nanometers in a dimension defined by said reference plane.

15. A disk drive that comprises:
a data storage disk that comprises a first data storage surface; and
a head positioner assembly that comprises a slider that extends along a reference axis that defines a longitudinal extent of said slider, wherein said slider comprises:
  upper and lower surfaces, wherein said lower surface projects said first data storage surface of said data storage disk;
  a leading edge and a trailing edge which is longitudinally spaced from said leading edge relative to said reference axis, wherein said data storage disk moves relative to said slider in a direction which is at least generally from said leading edge of said slider to said trailing edge of said slider; and
  first and second sides which are laterally-spaced relative to said reference axis, wherein said lower surface of said slider comprises:
    an air bearing surface system disposed within a first reference plane; and
    a first wear pad comprising a first wear pad surface that defines a distal end of said first wear pad, wherein said first wear pad surface is separate from and not part of said air bearing surface system, and wherein at least a portion of said first wear pad surface is planar and is disposed at an angle relative to said first reference plane;
    a second wear pad comprising a second wear pad surface, wherein said first wear pad is disposed on said second wear pad surface, wherein a first portion of said second wear pad extending from a first longitudinal location toward said leading edge is a first material of a first hardness, wherein a second portion of said second wear pad extending from said first longitudinal location toward said trailing edge comprises a second material of a second hardness that is less than said first hardness; and
  a head comprising a sensor region that is occupied by that portion of said head that is disposed closest to said first wear pad surface, wherein a surface area of said first wear pad surface is only large enough to encompass a surface area of said sensor region when projected onto said first wear pad surface, taking into account mask alignment tolerances.

16. A disk drive, as claimed in claim 15, wherein:
said air bearing surface system is disposed at an angle relative to said first data storage surface of said data storage disk during disk drive operations.

17. A disk drive, as claimed in claim 15, wherein:
said first wear pad surface has a surface area of no more than about 100 μm².

18. A disk drive, as claimed in claim 15, wherein:
a trailing edge of said first wear pad and a portion of said head that is disposed closest to said first wear pad surface are spaced by a distance of no more than about 5 μm in a dimension defined by said reference plane.

19. A disk drive, as claimed in claim 15, wherein:
a trailing edge of said first wear pad is spaced from said trailing edge of said slider.

20. A disk drive, as claimed in claim 15, wherein:
said first wear pad surface is vertically offset from a portion of said lower surface extending from said first wear pad to said trailing edge of said slider by at least about 1 micro-inch.

21. A disk drive, as claimed in claim 15, wherein:
said first wear pad surface is vertically offset from a portion of said lower surface extending from said first wear pad to said trailing edge by at least about 1 micro-inch.

22. A disk drive, as claimed in claim 15, wherein:
a first portion of said lower surface next to said first wear pad is vertically spaced from said first wear pad surface by a distance of at least about 1 micro-inch.

23. A disk drive, as claimed in claim 15, wherein:
a first portion of said lower surface next to said first wear pad is vertically spaced from said first wear pad surface by a distance within a range of about 1 micro-inch to about 5 micro-inches.

24. A disk drive, as claimed in claim 15, wherein:
said first and second wear pad surfaces are vertically offset by a distance of at least about 1 micro-inch.

25. A disk drive, as claimed in claims 15, wherein:
said first and second wear pad surfaces are vertically offset by a distance within a range of about 1 micro-inch to about 5 micro-inches.

26. A disk drive, as claimed in claim 15, wherein:
said first wear pad comprises said second material.

27. A disk drive, as claimed in claim 26, wherein:
said second material comprises alumina.

28. A disk drive, as claimed in claim 15, wherein:
said slider comprises said first material, and wherein at least a portion of said air bearing surface system is defined by said first material.

29. A disk drive, as claimed in claim 15, wherein:
said lower surface of said slider comprises a recess disposed in front of said first wear pad in a direction of said leading edge of said slider, and wherein said recess has a depth of at least about 600 nm.

30. A disk drive, as claimed in claim 15, wherein:
said first wear pad is at least substantially centrally disposed between said first and second sides of said slider.

31. A method for operating a disk drive comprising a disk and a slider, wherein said slider comprises an air bearing surface system and a first wear pad on a lower surface of said slider that projects toward said disk, wherein said first wear pad is separate from and not part of said air bearing surface system, wherein said first wear pad comprises a first wear pad surface, wherein a head is embedded within said slider and comprises a sensor region that extends within said first wear pad at least toward said first wear pad surface, wherein said sensor region is that portion of said head that is disposed closest to said first wear pad surface, wherein said method comprises the steps of:
rotating said disk;
burnishing said first wear pad during a first portion of said rotating step which comprises defining a flat on said first wear pad surface that is disposed at an angle relative to said first air bearing surface system and that has a surface area of no more than about 100 µm², wherein said first wear pad contacts said disk during said burnishing step; and
generating a gap between said slider and said disk from said burnishing step, wherein a second portion of said rotating step continues after said burnishing step and comprises an entirety of said slider being disposed in spaced relation to said disk, wherein said second portion of said rotating step is subsequent-in-time to said first portion of said rotating step.

32. A method, as claimed in claim 31, further comprising the step of:
exerting at least substantially a constant fluid force on said first wear pad during said first and second portions of said rotating step.

33. A method, as claimed in claim 31, wherein:
said burnishing step comprises reducing a spacing between said sensor region and said disk.

34. A method, as claimed in claim 31, wherein:
forces exerted on said air bearing surface system by said rotating step are insufficient to lift said slider into a spaced relationship with said disk until after said burnishing step.

35. A disk drive that comprises:
a data storage disk that comprises a first data storage surface; and
a head positioner assembly that comprises a slider that extends along a reference axis that defines a longitudinal extent of said slider, wherein said slider comprises:
upper and lower surfaces, wherein said lower surface projects toward said first data storage surface of said data storage disk;
a leading edge and a trailing edge which is longitudinally spaced from said leading edge relative to said reference axis, wherein said data storage disk moves relative to said slider in a direction which is at least generally from said leading edge of said slider to said trailing edge of said slider; and
first and second sides which are laterally-spaced relative to said reference axis, wherein said lower surface of said slider comprises:
an air bearing surface system disposed within a reference plane;
a first wear pad comprising a first wear pad surface that defines a distal end of said first wear pad, wherein said first wear pad surface is separate from and not part of said air bearing surface system, wherein at least a portion of said first wear pad surface is planar and is disposed at an angle relative to said reference plane in which said air bearing surface system is disposed, and wherein said first wear pad surface has a surface area of no more than about 100 m²; and
a second wear pad comprising a second wear pad surface, wherein said first wear pad is disposed on said second wear pad surface, wherein a first portion of said second wear pad extending from a first longitudinal location toward said leading edge is a first material of a first hardness, and wherein a second portion of said second wear pad extending from said first longitudinal location toward said trailing edge comprises a second material of a second hardness that is less than said first hardness; and
a head carried by said slider and comprising a first sensor component that protrudes toward said first wear pad surface, wherein said first sensor component is disposed at or only slightly recessed from said first wear pad surface.

36. A disk drive that comprises:
a data storage disk that comprises a first data storage surface; and
a head positioner assembly that comprises a slider that extends along a reference axis that defines a longitudinal extent of said slider, wherein said slider comprises:
upper and lower surfaces, wherein said lower surface projects said first data storage surface of said data storage disk;
a leading edge and a trailing edge which is longitudinally spaced from said leading edge relative to said reference axis, wherein said data storage disk moves relative to said slider in a direction which is at least generally from said leading edge of said slider to said trailing edge of said slider; and first and second sides which are laterally-spaced relative to said reference axis, wherein said lower surface of said slider comprises:

an air bearing surface system disposed within a first reference plane;

a first wear pad comprising a first wear pad surface that defines a distal end of said first wear pad, wherein said first wear pad surface is separate from and not part of said air bearing surface system, and wherein at least a portion of said first wear pad surface is planar and is disposed at an angle relative to said first reference plane; and a second wear pad comprising a second wear pad surface, wherein said first wear pad is disposed on said second wear pad surface, wherein said first and second wear pad surfaces are vertically offset by a distance of at least about 1 micro-inch; and a head comprising a sensor region that is occupied by that portion of said head that is disposed closest to said first wear pad surface, wherein a surface area of said first wear pad surface is only large enough to encompass a surface area of said sensor region when projected onto said first wear pad surface, taking into account mask alignment tolerances.

* * * * *